US009798960B2

(12) United States Patent
Santos et al.

(10) Patent No.: US 9,798,960 B2
(45) Date of Patent: *Oct. 24, 2017

(54) IDENTIFICATION OF ITEM ATTRIBUTES USING ARTIFICIAL INTELLIGENCE

(71) Applicant: Amazon Technologies, Inc., Seattle, WA (US)

(72) Inventors: Anthony Alexander Santos, Seattle, WA (US); Adam James Finkelstein, Seattle, WA (US); David Akira Gingrich, Seattle, WA (US); David Michael Hurley, Seattle, WA (US); Siqi Zhao, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/414,433

(22) Filed: Jan. 24, 2017

(65) Prior Publication Data

US 2017/0132497 A1    May 11, 2017

Related U.S. Application Data

(63) Continuation of application No. 14/573,892, filed on Dec. 17, 2014, now Pat. No. 9,569,700.

(51) Int. Cl.
*G06K 9/62* (2006.01)
*G06K 9/66* (2006.01)
(Continued)

(52) U.S. Cl.
CPC .......... *G06K 9/66* (2013.01); *G06F 17/3028* (2013.01); *G06F 17/30256* (2013.01);
(Continued)

(58) Field of Classification Search
None
See application file for complete search history.

(56) References Cited

U.S. PATENT DOCUMENTS 7,472,077 B2    12/2008   Roseman et al.
7,685,074 B2     3/2010   Linden et al.
(Continued)

OTHER PUBLICATIONS

Salakhutdinov et al., "Learning with Hierarchical-Deep Models," IEEE Transactions on Pattern Analysis and Machine Intelligence, vol. 35, 2013.

*Primary Examiner* — Brian P Werner
(74) *Attorney, Agent, or Firm* — Knobbe, Martens, Olson & Bear, LLP

(57) ABSTRACT

A system that identifies attributes of an item depicted in an image using artificial intelligence is provided. For example, the system may use one or more deep belief networks (DBNs) or convolution neural networks (CNNs) trained to analyze images and identify attributes in items depicted in the images. A first artificial intelligence module may analyze an image to determine a type of item depicted in the image. The system may then select a second artificial intelligence module that is associated with the type of item and use the second artificial intelligence module to identify attributes in the item depicted in the image. Identified attributes, if associated with a confidence level over a threshold value, may be provided to a user. The user may provide feedback on the accuracy of the identified attributes, which can be used to further train the first and/or second artificial intelligence modules.

20 Claims, 7 Drawing Sheets

(51) Int. Cl.
*G06N 3/08* (2006.01)
*G06N 3/04* (2006.01)
*G06K 9/46* (2006.01)
*G06F 17/30* (2006.01)

(52) U.S. Cl.
CPC ............ *G06K 9/46* (2013.01); *G06K 9/6202* (2013.01); *G06K 9/623* (2013.01); *G06N 3/04* (2013.01); *G06N 3/08* (2013.01)

(56) References Cited

U.S. PATENT DOCUMENTS

| | | | |
|---|---|---|---|
| 8,122,020 | B1 | 2/2012 | Donsbach et al. |
| 8,417,562 | B1 * | 4/2013 | Siemens ............ G06Q 10/0635 705/27.1 |
| 2007/0118441 | A1 * | 5/2007 | Chatwani ........... G06Q 30/0603 705/27.1 |
| 2009/0304267 | A1 * | 12/2009 | Tapley ................ G06F 17/3025 382/156 |
| 2010/0217684 | A1 * | 8/2010 | Melcher ............. G06Q 30/0603 705/26.1 |
| 2012/0117072 | A1 * | 5/2012 | Gokturk ............. G06Q 30/0278 707/740 |
| 2015/0127430 | A1 * | 5/2015 | Hammer, III ...... G06Q 30/0206 705/7.35 |
| 2015/0227809 | A1 | 8/2015 | Alpert et al. |
| 2015/0238148 | A1 | 8/2015 | Georgescu et al. |

* cited by examiner

IDENTIFICATION OF ITEM ATTRIBUTES USING ARTIFICIAL INTELLIGENCE

CROSS-REFERENCE TO RELATED APPLICATIONS

This application is a continuation of U.S. patent application Ser. No. 14/573,892, entitled "IDENTIFICATION OF ITEM ATTRIBUTES USING ARTIFICIAL INTELLIGENCE," filed Dec. 17, 2014, the entirety of which is hereby incorporated by reference herein.

BACKGROUND

Users that list items for viewing by others in a network-accessible system sometimes provide inaccurate or inadequate descriptions of such items. For example, a first user may upload a picture of a pair of black shoes with brown laces. In the description of the item, the first user may indicate that the shoes are dark brown and fail to mention the color of the laces. A second user may wish to view items that are black shoes with brown laces and may enter an appropriate search query into the network-accessible system. However, the search for black shoes with brown laces may not yield the item offered by the first user in the list of results. Furthermore, a third user seeking brown shoes may enter an appropriate search query in the network-accessible system and inaccurately receive the item offered by the first user as a result. Thus, without clean and trustworthy descriptions, users may have a difficult time finding relevant items.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

Figure 1A:
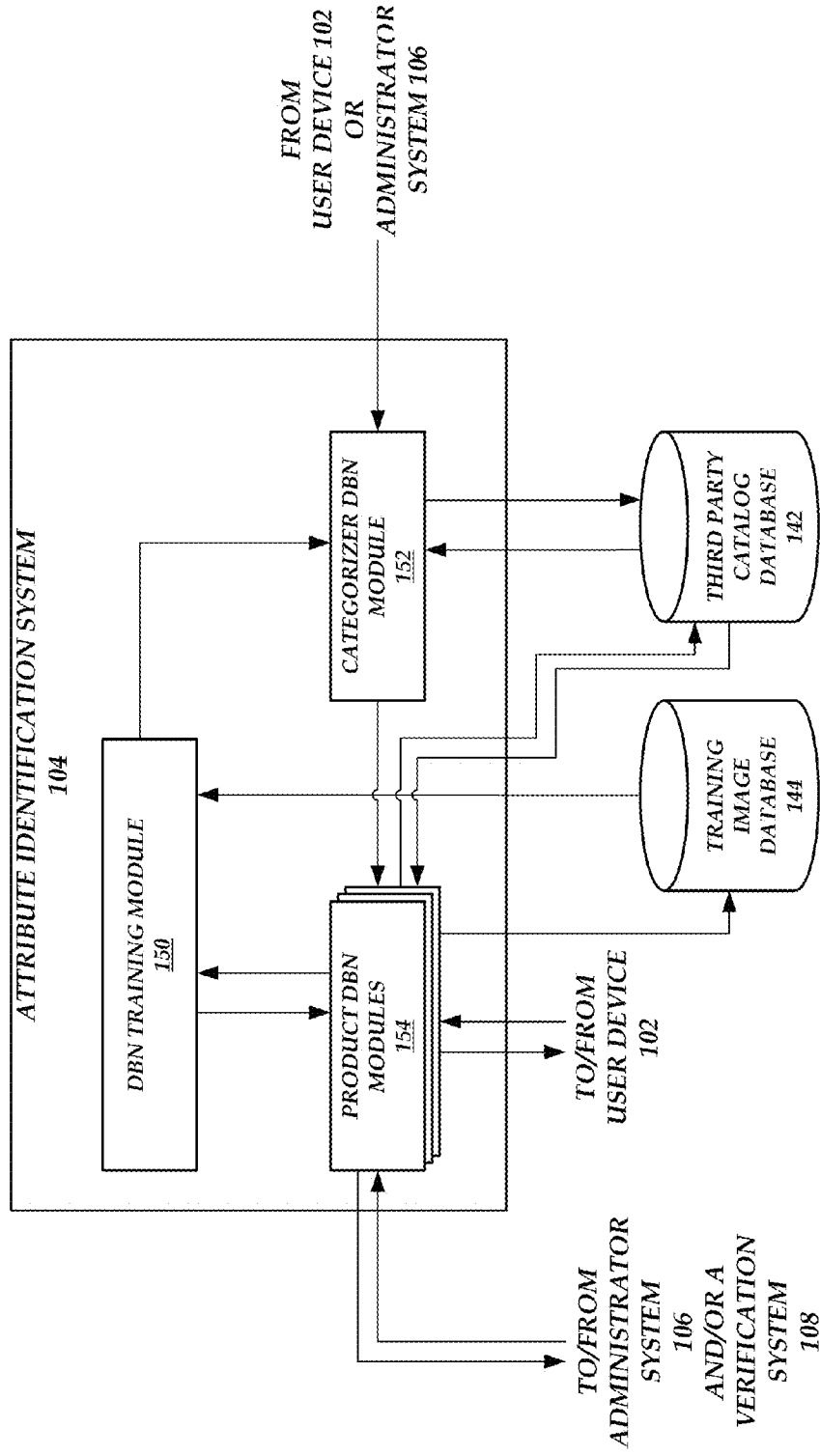
FIG. 1A illustrates various blocks in a catalog item attribute identification system that can be used to identify the attributes of an item.

As described above, users that wish to offer items in a network-accessible system often misidentify the item or inadequately describe the item. For example, such network-accessible systems may include electronic marketplaces that allow sellers to list items for sale. When creating a listing for an item offered for sale, a seller may inaccurately or inadequately describe the item. Such issues with the descriptions can reduce the effectiveness of search engines as users searching for a particular item may not come across an offered item even if the item is relevant or may come across items that are not relevant. Thus, without clean and trustworthy descriptions, users seeking items for sale may have a difficult time finding relevant results.

Accordingly, the embodiments described herein provide an attribute identification system for identifying attributes of an item and/or recommending the identified attributes to a user that may wish to offer the item in a network-accessible system using artificial intelligence. The attribute identification system may identify the attributes based on an image depicting the item that is provided by the user. For example, the systems and methods described herein may use artificial intelligence (e.g., machine learning techniques, such as deep belief networks (DBNs) and convolutional neural nets (CNNs)) to identify the attributes from the provided image. DBNs may have the following characteristics: a generative graphical model that includes multiple layers of latent variables (e.g., hidden units) and connections between the layers, but not connections between units within each layer; and a system that, when trained on a set of examples in an unsupervised way, can learn to probabilistically reconstruct its inputs, where the layers act as feature detectors on the inputs, and that, when trained on a set of examples in a supervised way, can perform classification. CNNs may have the following characteristics: a feed-forward artificial neural network where the individual neurons of the CNN are tiled in a manner such that the neurons respond to overlapping regions in a visual field; a neural network that includes multiple layers of small neuron collections that look at small portions of an input image, where the results are tiled to overlap and provide a better representation of the input image; and a neural network that can be used for image recognition. The DBNs or CNNs may be trained on a set of images that depict one or more items. Some images may be annotated such that a type of item depicted in the image, attributes, and/or locations of the attributes are indicated in the image. Other images may include no annotations. Using these images, the DBNs or CNNs may be trained to identify different items present in an image as well as the attributes of those items when presented with the image. For simplicity, the attribute identification system is described herein with reference to DBNs; however, this is not meant to be limiting. The attribute identification system described herein can be implemented with any artificial intelligence, such as with CNNs or a combination of DBNs and CNNs.

The attribute identification system may use a single, general DBN to identify an item depicted in an image and the item's attributes. The attribute identification system may also use a plurality of DBNs to identify an item depicted in an image and the item's attributes. For example, the attribute identification system may pass an image through a categorizer DBN. The categorizer DBN may be trained using a plurality of images that each depict a single item. The categorizer DBN may identify a type of item depicted in the image. The categorizer DBN may also provide a level of confidence that the item depicted in the image is actually the identified type of item. Based on the identified type of item, the attribute identification system may select one or more DBNs that are associated with the identified type of item. For example, one or more DBNs may be trained specifically using images that depict a single item and/or using images that are annotated to indicate a single attribute in a single item. The one or more DBNs associated with the identified type of item may then identify attributes of the item depicted in the image.

In some embodiments, the categorizer DBN identifies a plurality of possible types of items that may be depicted in the image, where each identified possibility is associated with a confidence level. For example, the categorizer DBN may determine that the image depicts a first type of item (e.g., a shoe) with a first confidence level (e.g., 50%) and may determine that the image depicts a second type of item (e.g., a boot) with a second confidence level (e.g., 30%). The categorizer DBN may select the type of item that has the highest confidence level and select one or more DBNs that are associated with the type of item that has the highest confidence level to identify attributes. Alternatively, the categorizer DBN may select one or more DBNs associated with one or more identified types of item (regardless of confidence level) and use the selected DBNs to identify attributes. For example, the selected DBNs for each possible type of item may run in parallel to identify attributes.

As described herein, the identified attributes may each be associated with a confidence level. The categorizer DBN (or the selected item-specific DBNs) may group the identified attributes and their confidence levels by type of item, and choose the group of identified attributes that collectively have the highest confidence level (e.g., the group that has the highest average confidence level, the group that has the highest individual confidence level, etc.). Alternatively, the categorizer DBN (or the selected item-specific DBNs) may select a plurality of groups (e.g., if the collective confidence levels are similar). This may occur if the image depicts multiple items (like pants and shoes).

The attribute identification system may identify attributes in a variety of contexts. For example, a user may upload an image to the network-accessible system. Upon receiving the image, the attribute identification system may send the image to the general DBN, and the general DBN may produce a list of possible attributes of the item in the image. Alternatively, the attribute identification system may send the image to the categorizer DBN, and the categorizer DBN may identify a type of item depicted in the image. The attribute identification system may then select one or more DBNs associated with the type of item, and the one or more DBNs, using the image, may each produce a list of possible attributes of the item in the image. Each attribute in the list of possible attributes of the items in the image may be associated with a confidence level. The attribute identification system may select attributes from the list that have a confidence level over a threshold value. For example, the attribute identification system may select attributes from the list that have a confidence level over 90%. The attributes that have a confidence level over the threshold value may be presented to the user as suggested attributes to add to the description of the item. In some embodiments, the user can provide feedback to the attribute identification system identifying which suggested attributes are correct and which suggested attributes are incorrect. Such feedback may be used to update the training of the general DBN, the categorizer DBN, and/or the DBNs specific to the type of item.

As another example, a listing for an item may already be present in the network-accessible system. The attribute identification system may be used to evaluate the accuracy and adequateness of the item description provided by a user. Similar to the process described above, an image present in the listing may be passed through the general DBN or the categorizer DBN and one or more DBNs specific to the type of item. Upon receiving the list of possible attributes of the item in the image and selecting attributes from the list that have a confidence level over a threshold value, the attribute identification system may compare the attributes provided in the item description with the selected attributes. The attribute identification system may identify attributes that conflict (e.g., the attributes provided in the item description may state that the shoes are black, whereas the selected attributes may state that the shoes are brown) and attributes present in the selected attributes that are not present in the attributes provided in the item description. The attribute identification system may use these results to validate (e.g., if there are no conflicts and no missing attributes) or invalidate (e.g., if there are conflicts or missing attributes) the user's description. Alternatively or in addition, the attribute identification system may present to the user associated with the listing an indication of which attributes conflict (and a suggested correction based on the attributes present in the selected attributes), if any, and which attributes are missing (based on the attributes present in the selected attributes), if any. In some embodiments, the user may be asked to provide confirmation on whether the suggestions are acceptable. The feedback provided by the user may be used to update the training of the general DBN, the categorizer DBN, and/or the DBNs specific to the type of item. In other embodiments, the attribute identification system may auto-correct the item description provided by the user using the attributes from the list that have a confidence level over the threshold value without requesting a confirmation or verification of the identified attributes from the user.

As another example, the attribute identification could be offered as a service. A third party could provide an image to the attribute identification system and receive a list of attributes using any of the processes described above. Upon identifying the item in the image, the attribute identification system may also access an item database that includes attributes of the item that may not be visible in the image (e.g., the type of engine in a car) and include these attributes in the list of attributes. The third party may use the list of attributes for any number of purposes. For example, the third party may include the attributes in an article that reviews the item in the image. As another example, the third party may use the service to identify an item and the item's features in an otherwise unlabeled image.

Attributes can include features of an item, such as the size of the item, the material used to build or make the item, the item brand, the color of the item or subparts of the item, and/or the like. Attributes can also include non-catalog features, such as features related to the packaging of an item (e.g., a cover is damaged or bent), the quality or status (e.g., used, gently used, new, etc.) of the specific item depicted in the image (e.g., a hat appears to be in good condition, shoes appear to be heavily used and in bad condition, etc.), the image depicting the item (e.g., the image includes too much glare making it hard to see the item), and/or the like. In some embodiments, the attribute identification system and/or the network-accessible system may ask the user to provide an image from a particular angle, of a particular page, etc., such that the quality or status of the specific item can be judged equally or nearly equally among listings for similar or the same items.

As described herein, the DBNs may be used in a hierarchical manner to identify attributes in an image. For example, a categorizer DBN may determine that the image depicts a type of item. The categorizer DBN may then select a DBN that is associated with the type of item to identify attributes. The selected DBN may further select additional DBNs that are trained to identify specific attributes for the type of item. This hierarchical use of DBNs may provide several technical benefits. In general, DBNs, CNNs, and/or the like may be slow to train (e.g., training may take weeks), slow to predict (e.g., identify attributes), and opaque (e.g., not much insight may be gained by examining the internal state of the DBN, CNN, etc.). If employing a single DBN or a single set of DBNs, such drawbacks may not be an issue. However, these drawbacks may become an issue at scale, when many (e.g., hundreds, thousands, etc.) DBNs are used to identify attributes for a wide range of items. It may be beneficial to be able to train DBNs quickly (e.g., less than 24 hours) so that the attribute identification system can be regularly updated. As described herein, identified attributes may be presented to users in real-time, and thus attribute identification performance may be important. Finally, even if the attribute identification system fails a small percentage of the time, such failures may be a large absolute number, and thus insight into the reasons for failure may be important.

Accordingly, breaking a single, large DBN (e.g., a general DBN) into a (hierarchical) graph or network of smaller DBNs, where the graph structure represents domain knowledge, may reduce the effects of the drawbacks described above. For example, the categorizer DBN may decide between top level categories (e.g., shoe, dress, etc.), which may require only broad knowledge (e.g., the relative differences between shoes, dresses, etc.). The DBNs that identify attributes for specific types of items (e.g., shoes, dresses, etc.) may require specialized knowledge, most of which may be unique to the type of item. Likewise a material identification DBN (e.g., a DBN that identifies material attributes) and a style DBN (e.g., a DBN that identifies style attributes) might be a subset of a dress DBN, and the knowledge possessed by these subset DBNs may be unique to the specific attribute. Several of these DBNs could run in parallel (e.g., both the shoe and dress DBN could be working simultaneously) and the output of each DBN may be joined at the end of the graph network. Joining the outputs may rectify the parallel DBNs (e.g., the dress DBN and its identified attributes may be chosen if the dress DBN attributes are associated with a high confidence level and/or the shoe DBN has trouble identifying attributes). Joining the outputs may also infer extra information (e.g., if a shoe and a dress are in different locations in the original image, the joining of the outputs may indicate that the original picture is an outfit, such as business attire).

Each DBN in the network of DBNs then can be smaller (e.g., include fewer hidden states) since the DBNs are solving a smaller problem space (e.g., by focusing on an attribute or a set of attributes for a type of item rather than all attributes for a plurality of types of items). Smaller DBNs may have fewer hidden states and fewer training examples, and thus, the smaller DBNs may be trained faster. Because attributes may be identified at each step in the network of DBNs (e.g., each DBN in the hierarchy may identify one or more attributes), problems may be spotted early by the system or user (e.g., the attribute identification system can inform the user that the attribute identification system is learning attributes for a dress and give the user the option of canceling the operation and/or identifying the item as a shoe), effectively providing insight into the internal state of the network of DBNs (or of a single, general DBN). In fact, by providing intermediary results to the user to identify problems early, the network of DBNs may reduce the amount of time to present identified attributes to the user (even if the identified attributes are incomplete). This may make the attribute identification system appear faster to the user even though the total attribute identification time may be slower due to the fact that there now may be multiple DBNs running in sequence.

Encoding domain knowledge in a network of DBNs may also allow flexibility in the types of DBNs and/or the network structure, allowing tuning for accuracy versus speed. For example, once a fabric swatch is identified via a CNN, a fixed algorithm can be used to determine color profile. This may be simpler than a DBN and may simplify other parts of the system (e.g., if other attributes (sole material, lace type, etc.) do not require color, the images could be converted to greyscale in order to make them ⅔ smaller). Large DBNs could also be split if they are running into training time constraints (e.g., dress shoes and sneakers could be split into two separate DBNs).

System Components

FIG. 1A illustrates various blocks in a catalog item attribute identification system 104 that can be used to identify the attributes of an item. The attribute identification system 104 may perform two main operations: train DBNs and identify attributes in images.

Training DBNs

In an embodiment, a training image database 144 stores images that can be used to train one or more DBNs. Some of the images in the training image database 144 may include annotations. For example, an annotation may be a polygonal boundary laid over a portion of an image (e.g., using a lasso tool) that is associated with a string value that identifies a feature or attribute of the item depicted in the image. The images may also include annotations that identify a type of item depicted in the image. Other images in the training image database 144 may not include annotations.

The training image database 144 may organize images such that they are associated with types of items, attributes of specific items, and/or the like. The training image database 144 may also include positive and negative samples associated with a type of item or with an attribute of a specific item. For example, a positive sample may be an image that includes an annotation identifying a specific attribute in the image. A negative sample may be an image that includes an annotation stating that an identified portion of the image is not or does not include the specific attribute.

The training image database 144 may be located external to the attribute identification system 104, such as on a separate system or server. The attribute identification system 104 may include a DBN training module 150 that trains one or more DBNs based on the images stored in the training image database 144. The attribute identification system 104 may include a general DBN (not shown), a categorizer DBN module 152, and one or more product DBN modules 154. The general DBN may be used to recognize attributes in images that depict any product. The categorizer DBN module 152 may include a categorizer DBN used to identify a type of item depicted in an image and the one or more product DBN modules 154 may each include one or more product DBNs specific to an item and identify attributes in images that depict the specific item. Thus, the DBN training module 150 may train the general DBN, the DBN in the categorizer DBN module 152, and/or the one or more DBNs in the one or more product DBN modules 154.

In an embodiment, the DBN training module 150 trains the general DBN using some or all of the images stored in the training image database 144. The DBN training module 150 may train the categorizer DBN in the categorizer DBN module 152 using a portion of the images stored in the training image database 144. For example, the portion may include images that depict a wide variety of items, but not images that specifically identify attributes for specific items. The DBN training module 150 may train the one or more product DBNs in the one or more product DBN modules 154 using a portion of the images stored in the training image database 144. For example, the portion may include images that are associated with the same item as the product DBN. In some cases, a product DBN is associated generally with a specific type of item and thus is trained using images associated with the specific item. In other cases, a product DBN is associated specifically with an attribute of a type of item and thus is trained using images associated with the specific attribute of the specific item. Thus, the product DBNs may be trained on different sets of images.

In some embodiments, the DBN training module 150 further trains the DBNs by providing a series of images and requesting the DBNs to identify attributes. The results may be reviewed (for example, by an administrator) and feedback regarding the results may be provided to the DBN training module 150. The DBN training module 150 may use the feedback to further refine the DBNs.

The use of the categorizer DBN and the product DBNs may provide some advantages over using a general DBN. For example, the training of the categorizer DBN and the product DBNs may be faster than the training of the general DBN because the DBN training module 150 may use less data in training the categorizer DBN and the product DBNs. In addition, the categorizer DBN and the product DBNs may run faster than the general DBN when used to analyze images because the categorizer DBN and the product DBNs are trained on less data. Furthermore, using the categorizer DBN and the product DBNs may provide greater accuracy than using a general DBN. For example, some items, such as books, may have an image within an image. A book cover may include a picture of a shoe. Generally, the attributes of the book may be important (e.g., title, author, etc.), but the attributes of the shoe on the cover of the book may not be important. A general DBN may provide attributes for the shoe because it may be trained to analyze both books and shoes. However, the product DBNs may be trained to analyze books only and specifically trained to ignore images within the boundaries of a book cover. Thus, the product DBN may not provide attributes of the shoe as a result.

The DBN training module 150 may periodically train the general DBN, the categorizer DBN, and/or the product DBNs. For example, the DBN training module 150 may initially train each DBN. As the DBNs are used and the users are provided with the identified attributes, the users may provide feedback. The feedback may be provided to the DBN training module 150 and/or stored in the training image database 144. At set intervals (e.g., once a day) or when feedback is provided, the DBN training module 150 can use the feedback to update the training of one or more of the DBNs (e.g., the DBNs that are associated with the item for which feedback is received).

Identifying Attributes in an Image

In an embodiment, a third party catalog database 142 stores listings of items that are available for viewing in a network-accessible system. The listings may include one or more images, a name or type of item for which the listings is generated, and a description of the item. The third party catalog database 142 may be located external to the attribute identification system 104 and/or the training image database 144, such as on a separate system or server. The third party catalog database 142 may be owned by the same entity as the entity that owns the network-accessible system and/or the attribute identification system 104, may be owned by an entity related to the entity that owns the network-accessible system and/or the attribute identification system 104, or may be owned by an entity different from the entity that owns the network-accessible system and/or the attribute identification system 104.

The attribute identification system 104 may operate in one of a plurality of scenarios. In a first scenario, the attribute identification system 104, and specifically the categorizer DBN module 152, may receive an image from a user device 102. The categorizer DBN module 152 may receive the image from the user device 102 as a user associated with the user device 102 attempts to upload the image for an item listing. The user may upload the image for a new listing or an existing listing. Alternatively, the attribute identification system 104, and specifically the categorizer DBN module 152, may receive an image from an administrator system 106. For example, the administrator system 106 may be a computing device operated by or associated with an administrator, employee, or other staff member associated with the attribute identification system 104 and/or the network-accessible system. The administrator system 106 may be at a location (e.g., a fulfillment center) where the administrator, employee, or staff member can take a picture of an item delivered by a user. The picture may then be provided to the attribute identification system 104 for a new listing or an existing listing. The categorizer DBN module 152 may use a categorizer DBN to identify a type of item depicted in the image. The categorizer DBN may also provide a level of confidence that the item depicted in the image is actually the identified type of item. The identified type of item, the confidence level, and/or the image may be forwarded to the product DBN modules 154.

The product DBN modules 154 may select one or more product DBNs that are associated with the type of item depicted in the image and use the selected product DBNs to identify one or more attributes of the item depicted in the image. The attributes may be provided as strings and the strings may match or closely match the strings present in the annotated images used to train the product DBNs. The selected product DBNs may also identify a confidence level associated with each identified attribute. The product DBN modules 154 may use the identified attributes and confidence levels to provide recommendations to the user device 102. For example, the product DBN modules 154 may identify those attributes that have a confidence level greater than a threshold value (e.g., 90%) and provide those attributes to the user device 102.

In some embodiments, the categorizer DBN identifies a plurality of possible types of items that may be depicted in the image, where each identified possibility is associated with a confidence level. The possible types of items may each be disjoint (e.g., discrete items, like shoes and books) or some or all may be mostly disjoint, but have some attribute overlap (e.g., shoes and boots are different items, but may have some attribute overlap) For example, the categorizer DBN may determine that the image depicts a first type of item (e.g., a shoe) with a first confidence level (e.g., 50%), a second type of item (e.g., a boot) with a second confidence level (e.g., 30%), and so on. The categorizer DBN may select the type of item that has the highest confidence level and forward the selected type of item, the confidence level, and/or the image to the product DBN modules 154. Alternatively, the categorizer DBN may forward different sets of data to the product DBN modules 154. For example, the categorizer DBN may forward the image, the first identified type of item and the associated confidence level, the second identified type of item and the associated confidence level, and so on. The categorizer DBN may forward data related to some of the identified types (e.g., the identified types that have a similar confidence level) or related to all of the identified types.

If the product DBN modules 154 receive a single identified type of item, the product DBN modules 154 may proceed as described above. If the product DBN modules 154 receive different sets of data, the product DBN modules 154 may identify one or more attributes for each of the received identified types of items. For example, for each received identified type of item, the product DBM modules 154 may select one or more product DBNs that are associated with the type of item and use the selected product DBNs to identify one or more attributes of the item depicted in the image. The product DBNs may be disjoint in that they are associated with a single type of item or may be mostly disjoint in that some are associated with different types of items that have some attribute overlap (e.g., shoes and boots). The selected product DBNs may also identify a confidence level associated with each identified attribute. The identification of the attributes and/or the confidence level associated with each identified attribute may be influenced by the confidence level of the type of item provided by the categorizer DBM module 152. For example, the confidence level associated with an attribute determined by an item-specific DBN may be adjusted (up or down) based on the level of confidence provided by the categorizer DBN that the item depicted in the image is actually the item that is associated with the item-specific DBN. As another example, the confidence level associated with the identified type of item and the confidence level associated with an attribute can be weighted to determine a final confidence level associated with the attribute. The product DBN modules 154 may operate the product DBNs in parallel such that the product DBNs produce the identified attributes and confidence levels at the same time or at nearly the same time.

The product DBN modules 154 may then group the identified attributes and corresponding confidence levels by type of item and select one of the groups. For example, the product DBN modules 154 may select the group that has the highest collective confidence level (e.g., the group that has the highest average confidence level, the group that has the highest individual confidence level, etc.). Alternatively, the product DBN modules 154 may select a plurality of groups (e.g., if the collective confidence levels are similar). This may occur if the image depicts multiple items (like pants and shoes). From the selected group or groups, the product DBN modules 154 may identify those attributes that have a confidence level greater than a threshold value (e.g., 90%) and provide those attributes to the user device 102.

In a second scenario, the categorizer DBN module 152 may receive an image from the third party catalog database 142. The categorizer DBN module 152 may receive the image upon a request to revise an existing listing (from, for example, an administrator, employee, or other staff member of the network-accessible system that is associated with the administrator system 106). Thus, the image may be a part of the existing listing. The categorizer DBN module 152 may use a categorizer DBN to identify a type of item depicted in the image. The identified type of image and the image may be forwarded to the product DBN modules 154. Alternatively, the existing listing may identify the type of item depicted in the image and the identified type may be forwarded directly to the product DBN modules 154. The categorizer DBN module 152 may also identify multiple possible types of items and the categorizer DBN module 152 and the categorizer DBN modules 154 may operate as described above to identify attributes that have a confidence level over a threshold value.

The product DBN modules 154 may select one or more product DBNs that are associated with the type of item depicted in the image and use the selected product DBNs to identify one or more attributes of the item depicted in the image. The attributes may be provided as strings and the strings may match or closely match the strings present in the annotated images used to train the product DBNs. The selected product DBNs may also identify a confidence level associated with each identified attribute. The product DBN modules 154 may identify those attributes that have a confidence level greater than a threshold value (e.g., 90%) and compare those attributes with the attributes provided in the item description stored in the third party catalog database 142. The product DBN modules 154 may identify attributes that conflict and attributes included in the identified attributes and not included in the attributes provided in the item description. The product DBN modules 154 may use these results to validate (e.g., if there are no conflicts and no missing attributes) the item description or to invalidate (e.g., if there are conflicts or missing attributes) the item description. Alternatively or in addition, the product DBN modules 154 may then provide suggested revisions to the user device 102 associated with the user that posted the listing. The revisions may include the identified attributes that conflict with the attributes provided in the item description (and a suggestion to remove and replace the conflicting attributes), if any, and the attributes included in the identified attributes and not included in the attributes provided in the item description (and a suggestion to add these attributes), if any.

In an embodiment, the identified attributes are incorporated without any feedback from the user. For example, the item description may be populated with the identified attributes and/or auto-corrected to include the identified attributes (and remove any conflicting attributes). The third party catalog database 142 may be updated to include the image (if not already stored) and the updated item description. In another embodiment, the user associated with the user device 102 may provide feedback on the identified attributes. For example, the user may verify that the identified attributes or suggested attribute revisions are accurate. The user may also provide additional attributes that were not included in the identified attributes or correct any recommended revisions to the attributes that are incorrect. In some cases, the user may annotate the image to identify the location of the additional attributes (e.g., annotate the image such that the image includes polygonal boundaries identifying the location of the attributes). The feedback may be provided to the DBN training module 150 such that the training of the categorizer DBN and/or the one or more product DBNs can be updated. Alternatively or in addition, the feedback (e.g., the annotated image) may be stored in the training image database 144. Once the user has provided feedback, the item description may be updated to incorporate the feedback. The attribute identification system 104 may update the third party catalog database 142 to include the image (if not already stored) and the updated item description.

In an embodiment, if the image uploaded by a user is for an item that is otherwise not available in the network-accessible system, the attribute identification system 104 may forward the identified attributes and/or the feedback provided by the user to the administrator system 106. An administrator, employee, or other staff member associated with the administrator system 106 may review the suggestions and feedback for quality control purposes and approve or deny the changes. Alternatively or in addition, the attribute identification system 104 may forward the identified attributes and/or the feedback provided by the user to an automated verification system 108 (e.g., either associated with the attribute identification system 104, the network-accessible system, or a third party server) that performs an independent verification of the suggestions and feedback and/or that requests comments on the suggestions and feedback from third party entities (e.g., other users that did not generate the listing). For example, the verification system 108 may be an automated crowd-sourcing system, such as the AMAZON MECHANICAL TURK® system. The automated verification system 108 may approve or deny the changes based on the performed verification or received comments.

In a further embodiment, the attribute identification system 104 bypasses the use of the categorizer DBN module 152 and the product DBN modules 154 under certain circumstances. For example, the third party catalog database 142 may store a signature for each stored image. The signature may be a hash value generated by performing a hash of the image. Upon receiving an image from the user device 102, the attribute identification system 104 may generate a signature for the image. The attribute identification system 104 may compare the generated signature with the signatures stored in the third party catalog database 142. If the generated signature matches any of the signatures stored in the third party catalog database 142, the attributes associated with the image associated with the matching signature may be retrieved from the third party catalog database 142 and provided to the user device 102. If the generated signature does not match any of the signatures stored in the third party catalog database 142, then the attribute identification system 104 may analyze the image as described above.

In a further embodiment, the attribute identification system 104 uses signatures to perform de-deduplication in the network-accessible system. For example, the attribute identification system 104, once an image has been analyzed and the attributes identified, may take a signature of the identified attributes (e.g., as a hash value) and store the signature (e.g., in the third party catalog database 142). When a user later provides an image for a new or existing listing that is analyzed by the attribute identification system 104 to identify attributes and a signature is taken of those attributes (or when the attribute identification system 104 is tasked with revising an existing listing), the attribute identification system 104 may compare the new signature with signatures stored in the third party catalog database 142. If, based on the comparison, the attribute identification system 104 finds that the new signature matches or nearly matches (e.g., the attribute identification system 104 finds that the signatures match with a confidence level greater than a threshold value) a previously generated signature (e.g., the attribute identification system 104 identified similar attributes based on an analysis of the associated images), then an identification of the listing associated with the matching signature may be retrieved from the third party catalog database 142. This may occur if, for example, the images associated with the matching or nearly matching signatures both depict the same item (even if the images are different). The attribute identification system 104 may then suggest to the user that or ask the user whether the listing created by the user should be updated to fall within (or be associated or linked with) the retrieved listing such that duplicate listings for the same item are avoided.

In a further embodiment, if the attribute identification system 104 has trouble identifying a type of item depicted in the image (e.g., all identified types of items are associated with a low confidence level or a confidence level lower than a threshold value) or if the attribute identification system 104 has trouble identifying an attribute (e.g., an attribute highlighted in the item description) allegedly depicted in the image (e.g., the identification of the attribute, if identified, is associated with a low confidence level or a confidence level lower than a threshold value), then the attribute identification system 104 may request that the user provide a new image that more clearly depicts the type of item or the attribute. For example, if the item description indicates that the image depicts a shoe with red laces, but the image only depicts a shoe without laces, then the attribute identification system 104 may not identify a red lace attribute. Thus, the attribute identification system 104 may recommend to the user that the user provide a new image that depicts a shoe with its laces. As another example, if the image is blurry and thus the type of item or the attributes cannot be identified (or identified at a low confidence level), then the attribute identification system 104 may recommend that the user provide a new image that is less blurry.

The attribute identification system 104 may be offered as a service. A third party could provide an image to the attribute identification system 104 and receive a list of attributes using any of the processes described above. Upon identifying the item in the image, the attribute identification system 104 may also access an item database (not shown) that includes attributes of the item that may not be visible in the image (e.g., the type of engine in a car) and include these attributes in the list of attributes. The third party may use the list of attributes for any number of purposes. For example, the third party may include the attributes in an article that reviews the item in the image. As another example, the third party may use the service to identify an item and the item's features in an otherwise unlabeled image.

System Components in an Example Environment

Figure 1B:
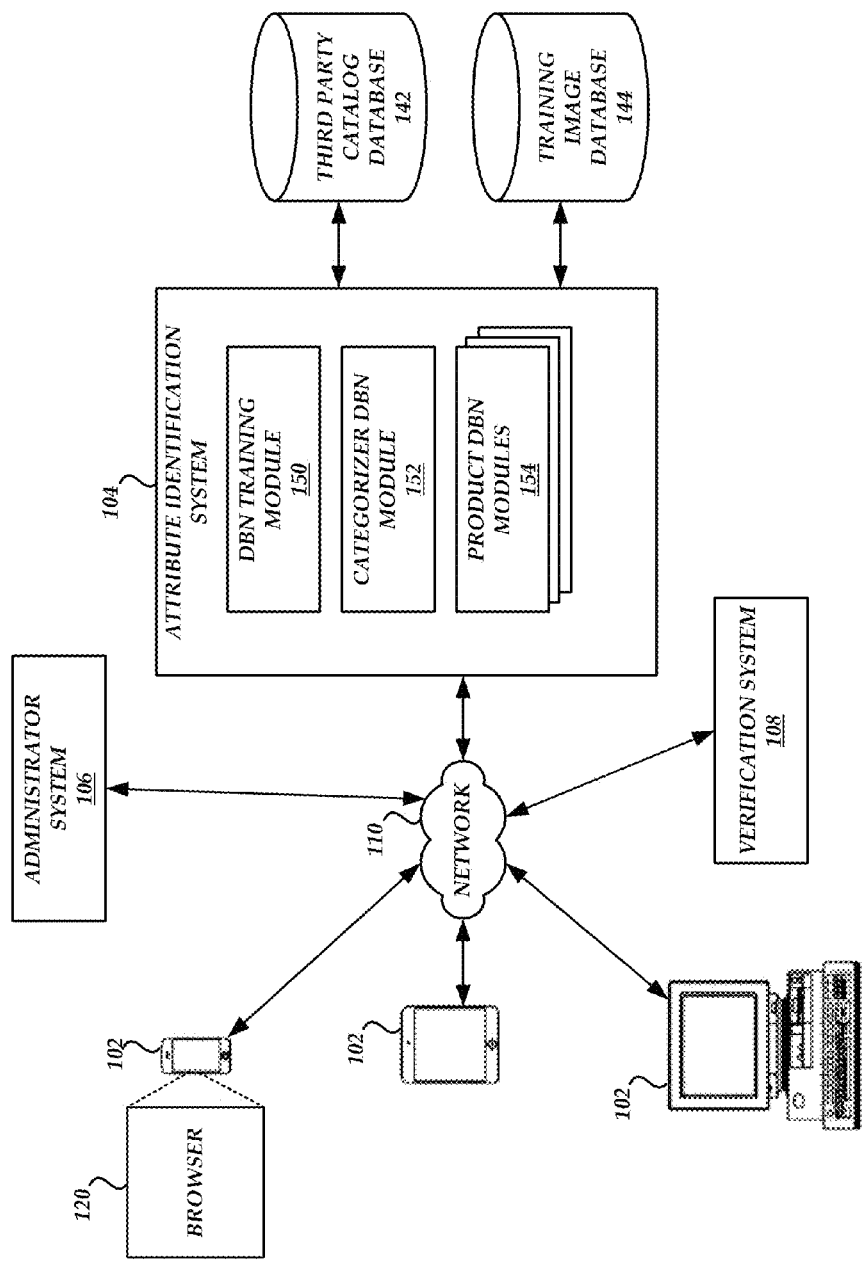
FIG. 1B illustrates an exemplary catalog item attribute identification environment with the attribute identification system of FIG. 1A according to one embodiment.

FIG. 1B illustrates an exemplary catalog item attribute identification environment with the attribute identification system 104 of FIG. 1A according to one embodiment. The environment shown in FIG. 1B may be one of many possible environments in which the attribute identification system 104 can be implemented. As illustrated in FIG. 1B, the environment includes various user devices 102, an administrator system 106, a verification system 108, and the attribute identification system 104. The attribute identification system 104 may include multiple distinct computers or machines, some of which may be assigned to different attribute identification tasks than others. The system components may communicate with each other via one or more communication networks 110. The network 110 may be a publicly accessible network of linked networks, possibly operated by various distinct parties, such as the Internet. In other embodiments, the network 110 may include a private network, personal area network, local area network, wide area network, cable network, satellite network, cellular telephone network, etc. or combination thereof, each with access to and/or from the Internet.

The environment may include any number of distinct user devices 102 and/or administrator systems 106. In addition, multiple (e.g., two or more) attribute identification systems 104 may be used. For example, separate attribute identification systems 104 may be located so that they are close (in either a geographical or networking sense) to groups of current or potential user devices 102 and/or administrator systems 106. In such a configuration, a user device 102 may receive an attribute identification via the attribute identification system 104 to which it is closest, rather than all user devices 102 receiving attribute identifications via a single attribute identification system 104.

The user devices 102 and the administrator system 106 can include a wide variety of computing devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), and various other electronic devices and appliances. Individual user devices 102 and/or the administrator device 106 may execute a browser application to communicate via the network 110 with other computing systems, such as the attribute identification system 104, in order to request and/or receive attribute identifications. The user devices 102 (and the administrator device 106, not shown) may execute a browser application 120 that can be used by a user (or administrator) to access a page that displays an item listing and identifies attributes to include in the item listing.

The attribute identification system 104 can be a computing system configured to suggest revisions to an existing item description, recommend attributes to include in a new item description, and/or generally provide a list of identified attributes based on an analysis of an image. For example, the attribute identification system 104 can be a physical server or group of physical servers that may be accessed via the network 110.

As described above with respect to FIG. 1A, the attribute identification system 104 may include various modules, components, data stores, and the like to provide the analysis and attribute identification functionality described herein. For example, the attribute identification system 104 may include the DBN training module 150, the categorizer DBN module 152, and the one or more product DBN modules 154. In some embodiments, the attribute identification system 104 may include additional or fewer modules than those shown in FIG. 1B. The attribute identification system 104 may be part of a larger electronic catalog system or site that provides functionality for users to, e.g., interactively browse, search for, review, rate, tag, purchase, sell and obtain recommendations of catalog items; examples of such systems are described, e.g., in U.S. Pat. Nos. 7,685,074, 7,472,077 and 8,122,020, the disclosures of which are hereby incorporated by reference.

The DBN training module 150, the categorizer DBN module 152, and/or the product DBN modules 154 can operate in parallel and for multiple users at the same time. For example, attribute identifications for unique user devices 102 may be requested and the components of the attribute identification system 104 can generate the identified attributes simultaneously or nearly simultaneously for the unique user devices 102 in "real-time," where "real-time" may be based on the perspective of the user. The generation of attributes may be considered to occur in real time if, for example, the delay is sufficiently short (e.g., less than a few seconds) such that the user typically would not notice a processing delay.

As described above, in some embodiments, the third party catalog database 142 is located external to the attribute identification system 104. For example, the third party catalog database 142 may be stored and managed by a separate system or server and may be in communication with the attribute identification system 104 via a direct connection or an indirect connection (e.g., via a network, such as the network 110). In other embodiments, not shown, the third party catalog database 142 is located within the attribute identification system 104.

The training image database 144 may also be located external to the attribute identification system 104. For example, the training image database 144 may be stored and managed by a separate system or server and may be in communication with the attribute identification system 104 via a direct connection or an indirect connection (e.g., via a network, such as the network 110). In other embodiments, not shown, the training image database 144 is located within the attribute identification system 104.

The verification system 108 may be located external to the attribute identification system 104 (e.g., associated with a third party system) or located internal to the attribute identification system 104. For example, the verification system 108 may be a Mechanical Turk system, such as the AMAZON MECHANICAL TURK® system. As described above, the verification system 108 may receive the identified attributes and/or the feedback provided by the user from the attribute identification system 104 via the network 110. The verification system 108 may perform an independent verification of the suggestions and feedback and/or request comments on the suggestions and feedback from third party entities (e.g., other users that did not generate the listing). The verification system 108 may approve or deny the changes based on the performed verification or the received comments and provide this feedback to the attribute identification system 104.

Example Process for Identifying an Attribute

Figure 2:
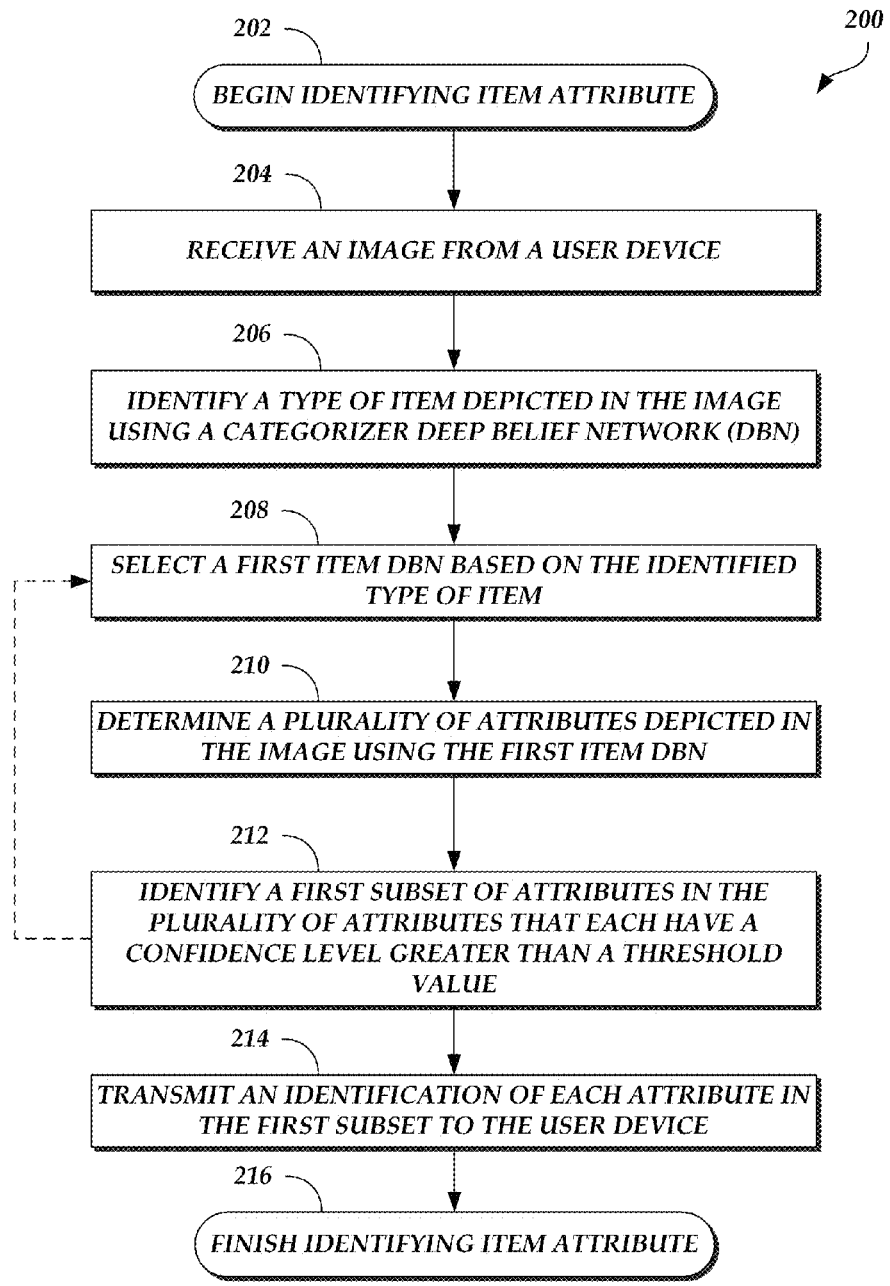
FIG. 2 illustrates a process that may be used by an attribute identification system to identify an attribute of an item using artificial intelligence.

FIG. 2 illustrates a process 200 that may be used by the attribute identification system 104 to identify an attribute of an item using artificial intelligence. As an example, the attribute identification system 104 of FIGS. 1A-1B can be configured to implement the item attribute identification process 200. The item attribute identification process 200 begins at block 202.

At block 204, an image is received from a user device. The image may be received as a user associated with the user device attempts to generate a listing for an item to be placed for viewing in a network-accessible system. The image may alternatively be received as a user provides a new picture for an existing listing.

At block 206, a type of item depicted in the image is identified using an artificial intelligence module, such as a categorizer DBN. The categorizer DBN may be trained to identify a type of item depicted in an image based on annotated and unannotated images stored in a training image database. An annotated image may identify an item depicted in the image, attributes of the item, and/or the locations of the attributes. In some embodiments, the categorizer DBN identifies a plurality of possible types of items depicted in the image. For example, the categorizer DBN may determine that the image depicts a first item with a first confidence level, a second item with a second confidence level, and so on.

At block 208, a second artificial intelligence module, such as a first item DBN, is selected based on the identified type of item. In an embodiment, the first item DBN is a product DBN that is trained to specifically recognize attributes of items that fall within the identified type of item.

At block 210, a plurality of attributes depicted in the image is determined using the first item DBN. Each attribute in the plurality of attributes may be associated with a confidence level that indicates a probability that the respective attribute is a feature of the item.

At block 212, a first subset of attributes in the plurality of attributes that each has a confidence level greater than a threshold value is identified. The threshold value may be set by an administrator or determined statistically based on feedback provided by users. For example, if attributes that are associated with a confidence level around 70% are consistently verified by users as accurate, the threshold value may be set to 70% or some value near 70% (e.g., a standard deviation below or above 70%). In some embodiments, after identifying the first subset of attributes, if the categorizer DBN identified multiple possible types of items, the item attribute identification process 200 returns to block 208 to select another item DBN for another possible type of item identified by the categorizer DBN. Blocks 208 through 212 may be repeated for each possible type of item identified by the categorizer DBN.

At block 214, an identification of each attribute in the first subset is transmitted to the user device. In some embodiments, the user associated with the user device provides feedback on the identified attributes received by the user device. The feedback may be used to update an item description and/or further train one or more DBNs. As described above, if the categorizer DBN identifies multiple possible types of items, the identifications of attributes transmitted to the user device may be derived from a group of attributes that collectively have a highest confidence level, where the group of attributes is associated with a single type of item. After the identification of each attribute in the first subset is transmitted to the user device, the item attribute identification process 200 may be complete, as shown in block 216.

Example Hierarchical DBN Usage

Figure 3:
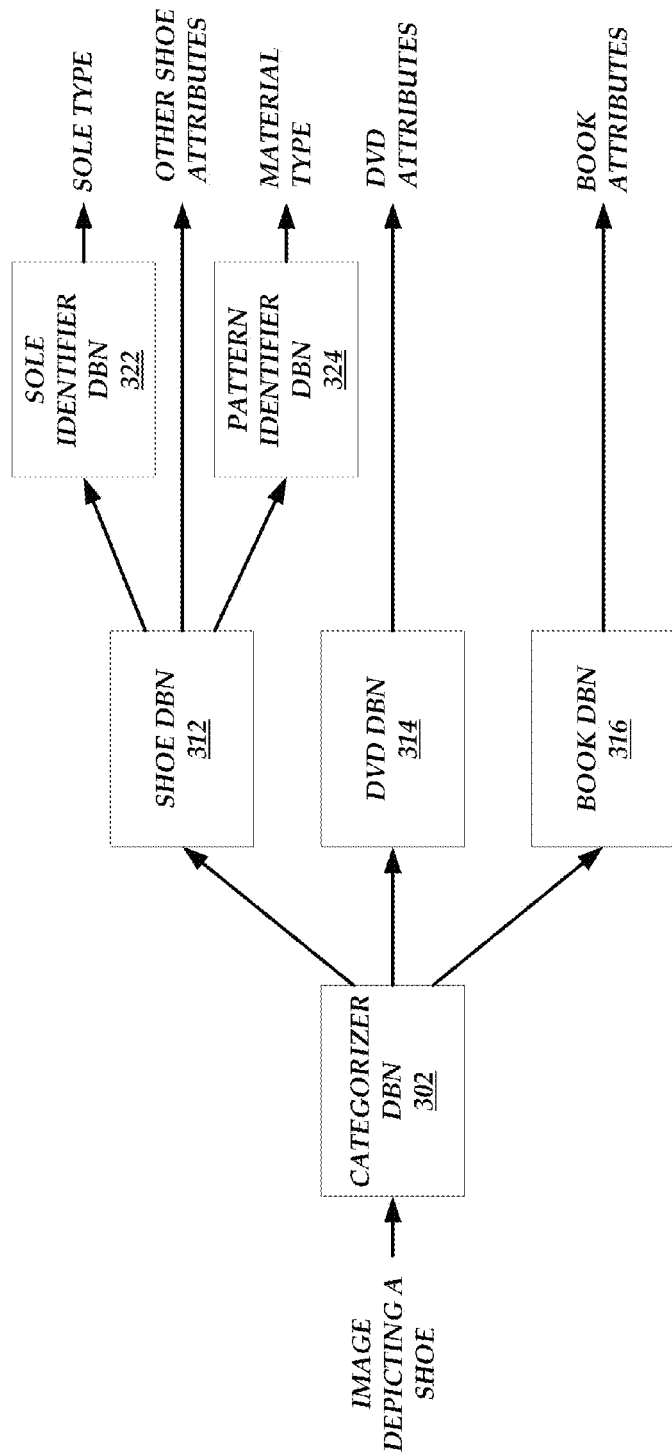
FIG. 3 illustrates the use of an exemplary hierarchical deep belief network (DBN) system to identify attributes using artificial intelligence.

FIG. 3 illustrates the use of an exemplary hierarchical DBN system to identify attributes using artificial intelligence. As described herein, a plurality of artificial intelligence modules, such as DBNs, may be used to identify attributes. FIG. 3 illustrates a three-tier DBN hierarchy. However, this is not meant to be limiting. The attribute identification system 104 may use any number of tiers and any number of DBNs within a tier (e.g., any number of DBNs run in succession and/or in parallel) to identify the attributes.

As illustrated in FIG. 3, categorizer DBN 302 is a root DBN that receives an image depicting a shoe. The categorizer DBN 302 may identify a type of item depicted in the image. Thus, here, the categorizer DBN 302 may recognize the image as depicting a shoe. Alternatively, the categorizer DBN 302 may identify multiple possibilities of types of items depicted in the image. In this case, the categorizer DBN module 302 may recognize the image as depicting a shoe with a first confidence level, a DVD with a second confidence level, and a book with a third confidence level. Based on this determination, the attribute identification system 104 may select DBNs that are specific to shoes, but also possibly DBNs that are specific to DVDs and books as well. For example, the attribute identification system 104 may select a shoe DBN 312, a DVD DBN 314, and/or a book DBN 316. The shoe DBN 312 may analyze the image and determine one or more attributes related to the specific shoe possibly depicted in the image. The DVD DBN 314 may analyze the image and determine one or more attributes related to the specific DVD possibly depicted in the image. The book DBN 316 may analyze the image and determine one or more attributes related to the specific book possibly depicted in the image.

In addition, the shoe DBN 312 may further call additional DBNs that each focus on a particular attribute or group of attributes. The shoe DBN 312 may send the image or a portion of the image to the additional DBNs for analysis. For example, the shoe DBN 312 may identify a view of the shoe depicted in the image. If the shoe DBN 312 identifies that the image depicts a bottom of the shoe, the shoe DBN 312 may send the image or a portion of the image showing the bottom of the shoe to a sole identifier DBN 322. The sole identifier DBN 322 may identify one or more attributes related to the type of sole of the shoe. Likewise, the shoe DBN 312 may send the image or a portion of the image showing the material of the shoe to a pattern identifier DBN 324, where the pattern identifier DBN 324 may identify one or more attributes related to the type of material of the shoe. The shoe DBN 312 may send the image or a portion of the image to any number of additional DBNs.

Once the attributes are identified, the attributes may be grouped by type (e.g., shoe, DVD, book, etc.) and the confidence levels in each group may be analyzed. In a manner as described above, one or more of the groups of attributes may be selected and the selected attributes may be forwarded to a user and/or used to update a listing.

Example Network Page Viewed on a User Device

Figure 4A:
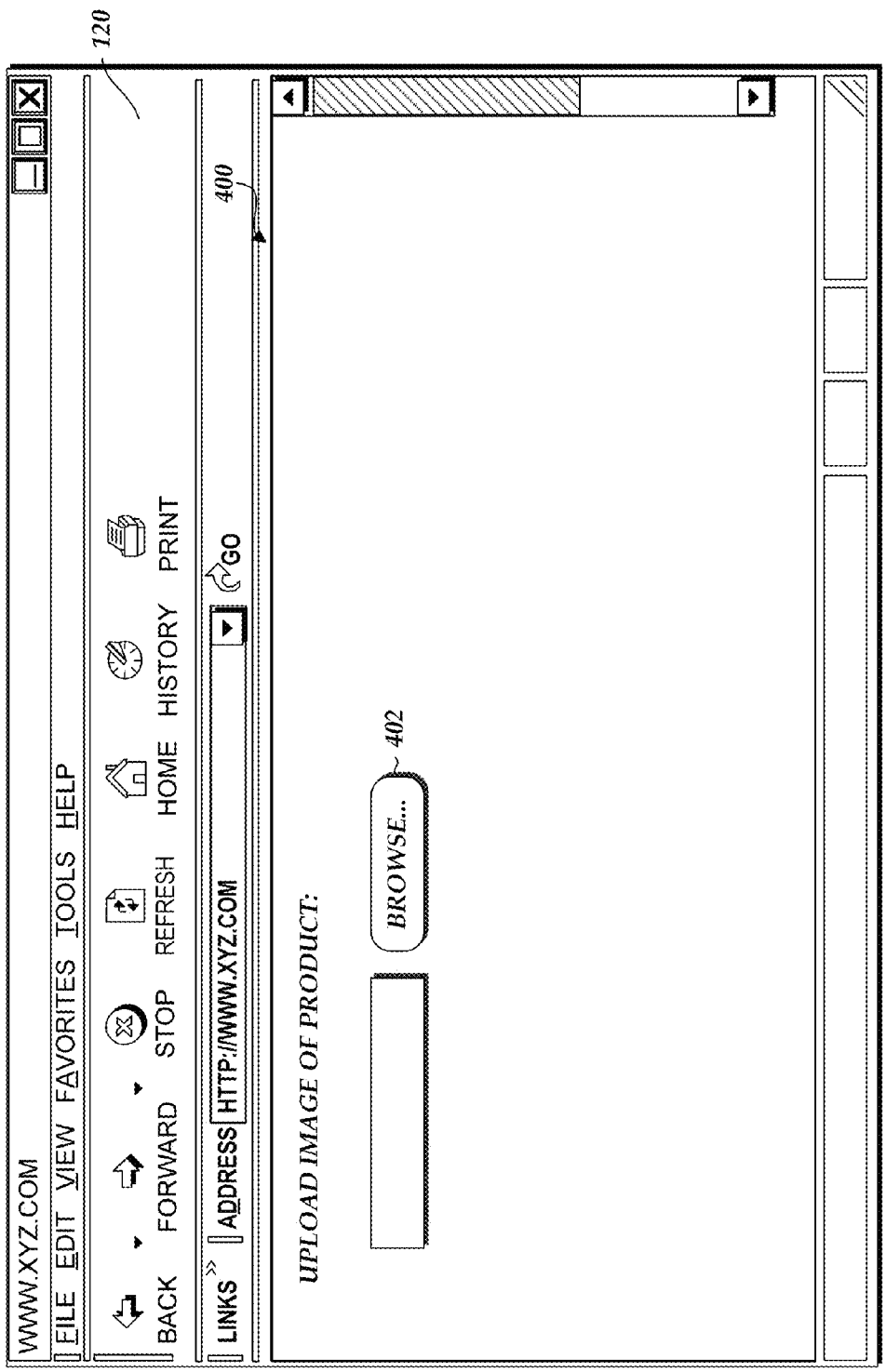
FIGS. 4A-4C illustrate an example of a representation of a network page displayed on a user device, such as the user device.
Figure 4B:
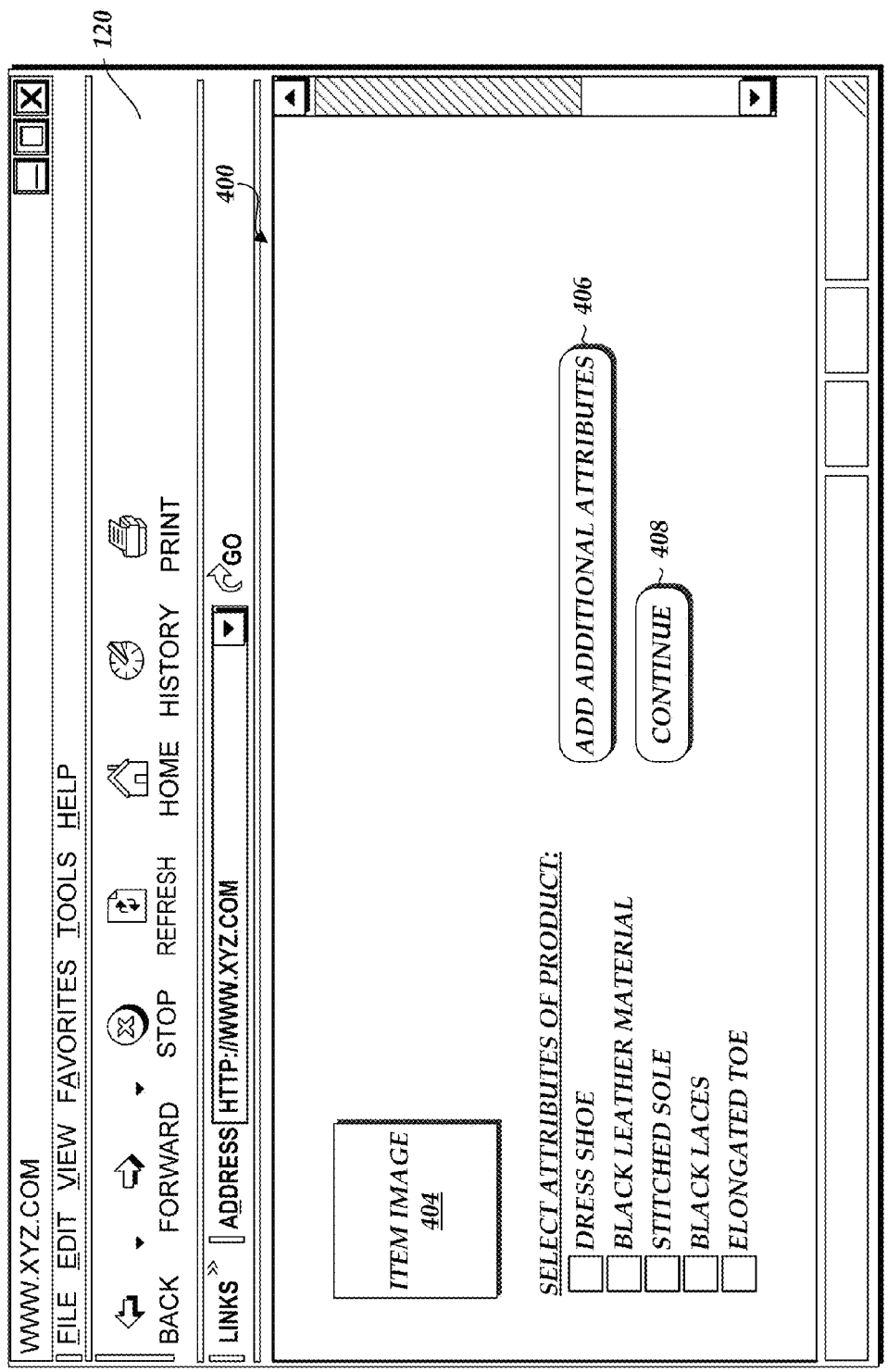
Figure 4C:
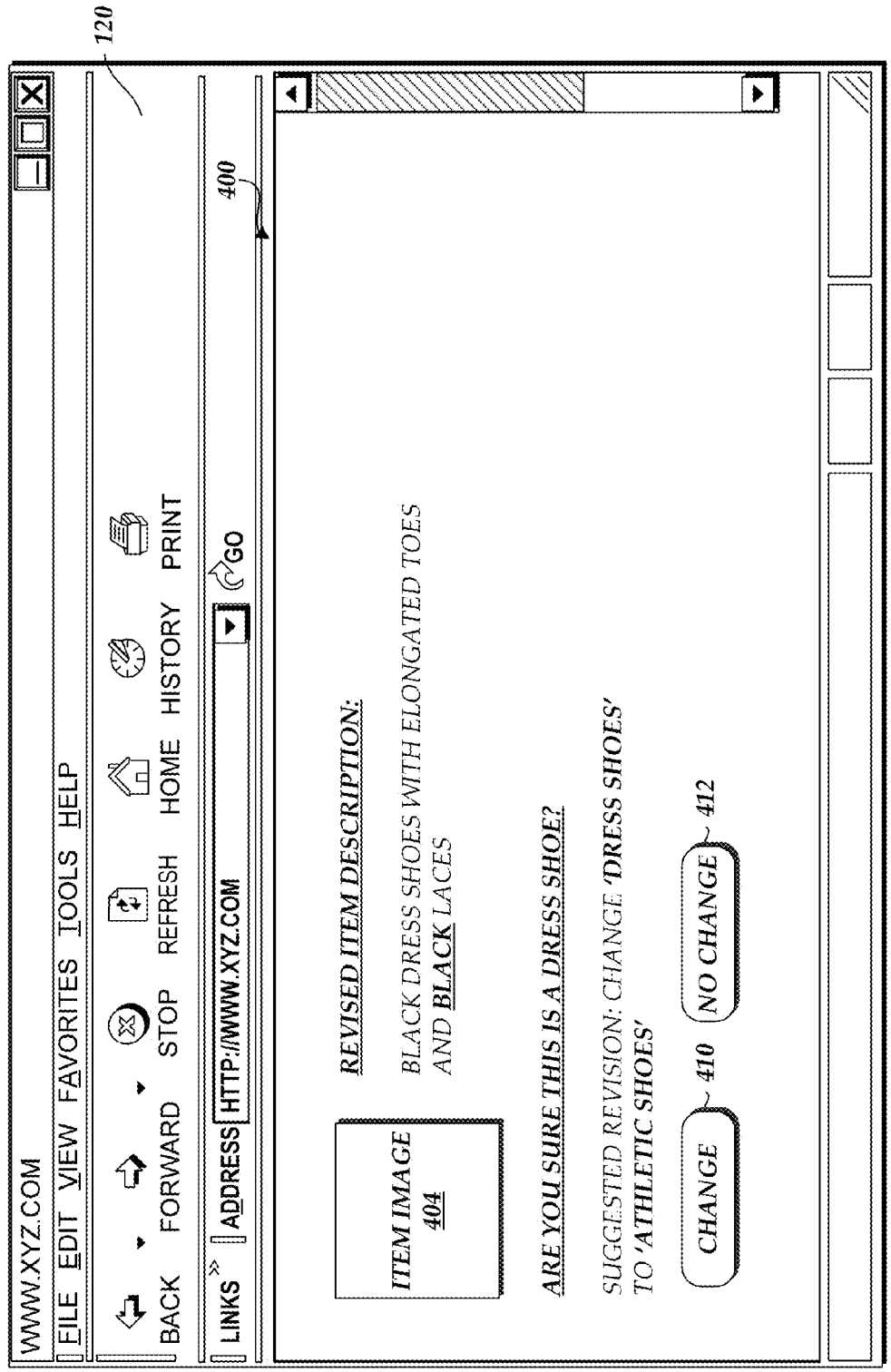

FIGS. 4A-4C illustrate an example of a representation of a network page 400 displayed on a user device, such as the user device 102. The network page 400 may be displayed within the user interface of the browser application 120 of the user device 102. As illustrated in FIG. 4A, the network page 400 requests a user to upload an image. For example, the user may choose an image saved locally to the user device 102 using browse button 402. The user may choose to upload an image to generate a new item listing or to add a new image to an existing item listing.

Upon uploading the image, the attribute identification system 104 may analyze the image using the general DBN, the categorizer DBN, and/or the one or more product DBNs. The attribute identification system 104 may produce a list of possible attributes based on the analysis. As illustrated in FIG. 4B, the network page 400 displays item image 404, which is the image uploaded by the user, and a list of attributes (e.g., dress shoe, black leather material, stitched sole, black laces, elongated toe) identified by the attribute identification system 104. The user may select any or all of the attributes to verify that the suggested or recommended attributes are accurate. The user may be able to verify the suggestions or recommendations by selecting continue button 408. In addition, the user may be able to add any attributes that are missing from the list by selecting add additional attributes button 406. Selecting the add additional attributes button 406 may allow the user to annotate the item image 404 to indicate the additional attributes (as a string) and a location of the additional attributes (via a polygonal boundary made using a tool like a lasso tool).

The attribute identification system 104 may receive feedback from the user after the user selects the continue button 408. For example, if all of the listed attributes are selected and the user provides no additional attributes, then the attribute identification system 104 may determine that the results were accurate. If some or none of the listed attributes are selected and/or the user provides additional attributes, then the attribute identification system 104 may determine that the results were semi-accurate or not accurate and provide this feedback to the DBN training module 150 so that the training of the appropriate DBNs can be updated.

In some embodiments, the user uploads the item image 404 to update an existing listing. As illustrated in FIG. 4C, the user may have provided an item description identifying the item in the item image 404 as black dress shoes with elongated toes and brown laces. However, the attribute identification system 104 may identify, based on an analysis of the item image 404, that the item appears to be athletic shoes rather than dress shoes and have black laces rather than brown laces. The attribute identification system 104 may automatically make changes to the item description or request verification from the user before making changes based on the confidence levels associated with the attribute. For example, the attribute identification system 104 may have a high confidence (e.g., 95% confidence level) that the laces are black and not brown, and thus may automatically fill-in and revise the item description such that the item description states that the laces are black. The attribute identification system 104 may have a lower confidence (e.g., 60% confidence level) that the shoes are athletic shoes and not dress shoes, and thus the network page 400 may identify the discrepancy and suggest to the user that the item description should be revised. The user may choose to accept the suggested changes by selecting change button 410 or may choose to disregard the suggested changes by selecting no change button 412.

Additional Embodiments

The attribute identification system 104 of FIGS. 1A-1B may be a single computing device, or it may include multiple distinct computing devices, such as computer servers, logically or physically grouped together to collectively operate as a server system. The components of the attribute identification system 104 can each be implemented in application-specific hardware (e.g., a server computing device with one or more ASICs) such that no software is necessary, or as a combination of hardware and software. In addition, the modules and components of the attribute identification system 104 can be combined on one server computing device or separated individually or into groups on several server computing devices. In some embodiments, the attribute identification system 104 may include additional or fewer components than illustrated in FIGS. 1A-1B.

In some embodiments, the features and services provided by the attribute identification system 104 may be implemented as web services consumable via the communication network 110. In further embodiments, the attribute identification system 104 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

TERMINOLOGY

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, and/or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on general purpose computer hardware, or combinations of both. To clearly illustrate this interchangeability of hardware and software, various illustrative components, blocks, modules, and steps have been described above generally in terms of their functionality. Whether such functionality is implemented as specialized hardware versus software running on general-purpose hardware depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system for analyzing an image in real-time using artificial intelligence comprising:
   a catalog database that stores images and attributes; and
   a server system configured to:
      receive an image and attributes associated with the image that are stored in the catalog database;
      determine a plurality of attributes depicted in the image using an artificial intelligence system, wherein the artificial intelligence system is trained using a plurality of images, and wherein individual attributes of the plurality of attributes are associated with a confidence level;
      identify a first subset of attributes in the plurality of attributes, wherein the first subset comprises attributes in the plurality that are associated with a confidence level greater than a threshold value; and
      compare the attributes associated with the image with the first subset of attributes to determine whether an item description in the catalog database accurately describes an item depicted in the image.

2. The system of claim 1, wherein the server system is further configured to:
   determine a second plurality of attributes depicted in the image using a second artificial intelligence system, wherein attributes of the second plurality are associated with a second confidence level;
   identify a third subset of attributes in the second plurality of attributes, wherein the third subset comprises attributes in the second plurality that are associated with a second confidence level greater than the threshold value; and
   update the catalog database to include at least one attribute in the third subset of attributes that is not included in attributes associated with the image.

3. The system of claim 1, wherein the catalog database comprises signatures associated with the images, and wherein the server system is further configured to:
   generate a signature using the image;
   compare the generated signature with signatures in the catalog database; and
   identify a type of item depicted in the image using a second artificial intelligence system in response to a determination that no signature in the catalog database matches the generated signature.

4. The system of claim 3, wherein the server system is further configured to generate the signature by calculating a hash value of the image.

5. The system of claim 1, wherein the server system is further configured to update the catalog database to include at least one attribute in the first subset of attributes that is not included in the attributes associated with the image.

6. The system of claim 1, wherein the artificial intelligence system comprises a network of hierarchical artificial intelligence systems, and wherein an artificial intelligence system in the network of hierarchical artificial intelligence systems identifies at least one attribute in the determined plurality of attributes.

7. A computer-implemented method for analyzing an image in real-time using artificial intelligence, the method comprising:
   as implemented by a computer system comprising one or more computing devices, the computer system configured with specific executable instructions, receiving an image and attributes associated with the image that are stored in a catalog database;

determining a plurality of attributes depicted in the image using an artificial intelligence system, wherein the artificial intelligence system is trained using a plurality of images, and wherein individual attributes of the plurality of attributes are associated with a confidence level;

identifying a first subset of attributes in the plurality of attributes, wherein the first subset comprises attributes in the plurality that are associated with a confidence level greater than a threshold value; and comparing the attributes associated with the image with the first subset of attributes to determine whether an item description in the catalog database accurately describes an item depicted in the image.

8. The computer-implemented method of claim 7, further comprising updating the catalog database to include at least one attribute in the first subset of attributes that is not included in the attributes associated with the image.

9. The computer-implemented method of claim 7, further comprising transmitting, to a user device, an identification of at least one attributes in the first subset of attributes that is not included in the attributes associated with the image.

10. The computer-implemented method of claim 7, further comprising transmitting, to a user device, an identification of an attribute in the first subset of attributes that conflicts with the attributes associated with the image.

11. The computer-implemented method of claim 7, further comprising:
receiving a confirmation from a user device indicating whether an attribute in the first subset of attributes transmitted to the user device is associated with the image; and
updating the catalog database to include an attribute in the first subset of attributes for which a confirmation is received that the attribute is associated with the image.

12. The computer-implemented method of claim 7, further comprising:
determining a second plurality of attributes depicted in the image using a second artificial intelligence system, wherein attributes of the second plurality are associated with a second confidence level;
identifying a third subset of attributes in the second plurality of attributes, wherein the third subset comprises attributes in the second plurality that are associated with a second confidence level greater than the threshold value; and
updating the catalog database to include at least one attribute in the third subset of attributes that is not included in attributes associated with the image.

13. The computer-implemented method of claim 7, further comprising:
generating a signature based on the first subset of attributes, wherein the image is associated with a first listing;
comparing the generated signature with signatures stored in the catalog database;
retrieving an identification of a second listing associated with a second signature that matches the generated signature; and transmitting, to a user device, the identification of the second listing and a suggestion to associate the first listing with the second listing.

14. The computer-implemented method of claim 7, wherein the plurality of attributes comprises at least one of size attributes, color attributes, or material attributes.

15. A non-transitory computer-readable medium having stored thereon an attribute identification module for analyzing an image in real-time using artificial intelligence, the attribute identification module comprising executable code that, when executed on a computing device, implements a process comprising:
receiving an image and attributes associated with the image that are stored in a database;
determining a plurality of attributes depicted in the image using an artificial intelligence system, wherein the artificial intelligence system is trained using a plurality of images, and wherein attributes of the plurality of attributes are associated with a confidence level;
identifying a first subset of attributes in the plurality of attributes, wherein the first subset comprises attributes in the plurality that are associated with a confidence level greater than a threshold value; and
comparing the attributes associated with the image with the first subset of attributes to determine whether an item description in the database accurately describes an item depicted in the image.

16. The non-transitory computer-readable medium of claim 15, wherein the attribute identification module further implements a process comprising:
generating a signature using the image;
comparing the generated signature with signatures associated with images stored in the database; and
identifying a type of item depicted in the image using a second artificial intelligence system in response to a determination that no signature in the database matches the generated signature.

17. The non-transitory computer-readable medium of claim 16, wherein the attribute identification module further implements a process comprising generating the signature by calculating a hash value of the image.

18. The non-transitory computer-readable medium of claim 15, wherein the plurality of attributes comprises at least one of size attributes, color attributes, material attributes, or item status attributes.

19. The non-transitory computer-readable medium of claim 15, wherein the artificial intelligence system comprises a network of hierarchical artificial intelligence systems, and wherein an artificial intelligence system in the network of hierarchical artificial intelligence systems identifies at least one attribute in the determined plurality of attributes.

20. The non-transitory computer-readable medium of claim 15, wherein the attribute identification module further implements a process comprising:
determining that at least one attribute of the plurality is associated with a confidence level that is lower than a second threshold value; and
transmitting a request to a user device to provide a second image.

* * * * *